(12) United States Patent
Faust

(10) Patent No.: US 6,750,808 B2
(45) Date of Patent: Jun. 15, 2004

(54) PROCESS INSTRUMENT WITH SPLIT INTRINSIC SAFETY BARRIER

(75) Inventor: Anthony M. Faust, Lombard, IL (US)

(73) Assignee: Maghetrol International Incorporated, Downers Grove, IL (US)

( * ) Notice: Subject to any disclaimer, the term of this patent is extended or adjusted under 35 U.S.C. 154(b) by 0 days.

(21) Appl. No.: 10/627,058

(22) Filed: Jul. 25, 2003

(65) Prior Publication Data

US 2004/0085240 A1 May 6, 2004

Related U.S. Application Data

(60) Provisional application No. 60/422,357, filed on Oct. 30, 2002.

(51) Int. Cl.[7] ............................................. G01S 13/08
(52) U.S. Cl. ........................................ 342/124; 342/198
(58) Field of Search ................................ 342/124, 198; 73/290 V, 290 R; 340/621, 624; 324/124, 629, 644; 367/189, 908

(56) References Cited

U.S. PATENT DOCUMENTS

| | | | | |
|---|---|---|---|---|
| 4,296,414 A | * | 10/1981 | Beyer et al. | 342/37 |
| 5,596,325 A | * | 1/1997 | Maas | 342/28 |
| 5,609,059 A | * | 3/1997 | McEwan | 73/290 R |
| 5,611,239 A | * | 3/1997 | Klinshteyn | 73/290 V |
| 5,973,637 A | * | 10/1999 | Perdue et al. | 342/124 |
| 6,320,532 B1 | * | 11/2001 | Diede | 342/124 |
| 6,535,161 B1 | * | 3/2003 | McEwan | 342/124 |
| 2001/0050629 A1 | * | 12/2001 | Benway et al. | 342/124 |

OTHER PUBLICATIONS

Standard for Intrinsic Safety—EN 50020: 1994 (pp. 22 and 25–27).
Intrinsic Safety—Pepperl & Fuchs.

* cited by examiner

Primary Examiner—Thomas H. Tarcza
Assistant Examiner—Isam Alsomiri
(74) Attorney, Agent, or Firm—Wood, Phillips, Katz, Clark & Mortimer

(57) ABSTRACT

A process instrument comprises a housing, a terminal in the housing for connection to a two-wire process loop and an active element for sensing a characteristic of a process. A control circuit is disposed between the terminal and the active element for measuring the sensed characteristic and controlling the two-wire process loop responsive to the sensed characteristic. A split intrinsic safety barrier comprises current limiters electrically connected between the terminal and the control circuit and a diode safety barrier electrically connected between the control circuit and the active element.

20 Claims, 3 Drawing Sheets

PROCESS INSTRUMENT WITH SPLIT INTRINSIC SAFETY BARRIER

CROSS REFERENCE TO RELATED APPLICATION

This application claims priority of Provisional Application No. 60/422,357, filed Oct. 30, 2002.

FIELD OF THE INVENTION

This invention relates to a process measurement instrument and, more particularly, to a split intrinsic safety barrier.

BACKGROUND OF THE INVENTION

Knowledge of level and flow and the like in industrial process tanks or vessels has long been required for safe and cost-effective operation of plants. Many technologies exist for making such measurements. Many of these devices use an active sensing element which is exposed to the process.

Two wire measurement instruments are frequently installed in potentially explosive atmospheres. Two common safety considerations are to design the entity as intrinsically safe or use an explosion proof device. As an intrinsically safe entity, typically a diode barrier in the control room limits the energy available to the instrument. As an explosion proof entity an instrument housing prevents any explosive faults from propagating into the surrounding explosive atmosphere. However, the explosion proof housing does not protect the external active element from being a point for generating explosive faults. For explosive proof applications, the active element needs a secondary protective device.

One solution is to use a fuse protected diode safety barrier inside the explosion proof housing to limit the energy at the active element. The fuse protected diode safety barrier may include shunt diodes or diode chains, including zener diodes, protected by fuses and resistors. The diodes limit voltage, while the resistors limit current. The fuses limit excessive surge currents. One known option is to place the fuse protected diode safety barrier in the housing between the two-wire connection and the instrument electronic circuitry. In this configuration, the two-wire DC current requirement and barrier grounding requirements introduce unwanted ground loops. Another known solution is to place the fuse protected diode safety barrier between the electronics and the probe with AC coupling to eliminate ground loops. However, the fuse inductance can cause unwanted distortions in the measured signal.

The present invention is directed to solving one or more of the problems discussed above in a novel and simple manner.

SUMMARY OF THE INVENTION

In accordance with the invention there is provided a process instrument with a split intrinsic safety barrier.

In one aspect of the invention, a process instrument comprises a housing, a terminal in the housing for connection to a two-wire process loop and an active element for sensing a characteristic of a process. A control circuit is disposed between the terminal and the active element for measuring the sensed characteristic and controlling the two-wire process loop responsive to the sensed characteristic. A split intrinsic safety barrier comprises current limiters electrically connected between the terminal and the control circuit and a diode safety barrier electrically connected between the control circuit and the active element.

In accordance with the invention, the active element may comprise a guided wave radar transmission line, a capacitance probe, a through air radar transducer or an ultrasonic transducer.

It is a feature of the invention that the current limiters comprise fuses.

It is another feature of the invention that the diode safety barrier comprises a plurality of diodes connected across the active element. The diodes may comprise a plurality of pairs of reverse connected diodes or a plurality of zener diodes. The diode safety barrier is AC coupled to the control circuit.

It is another feature of the invention that the diode safety barrier comprises a current limit resistor.

Further features of the invention will be readily apparent from the specification and from the drawings.

DETAILED DESCRIPTION OF THE INVENTION

Figure 1:
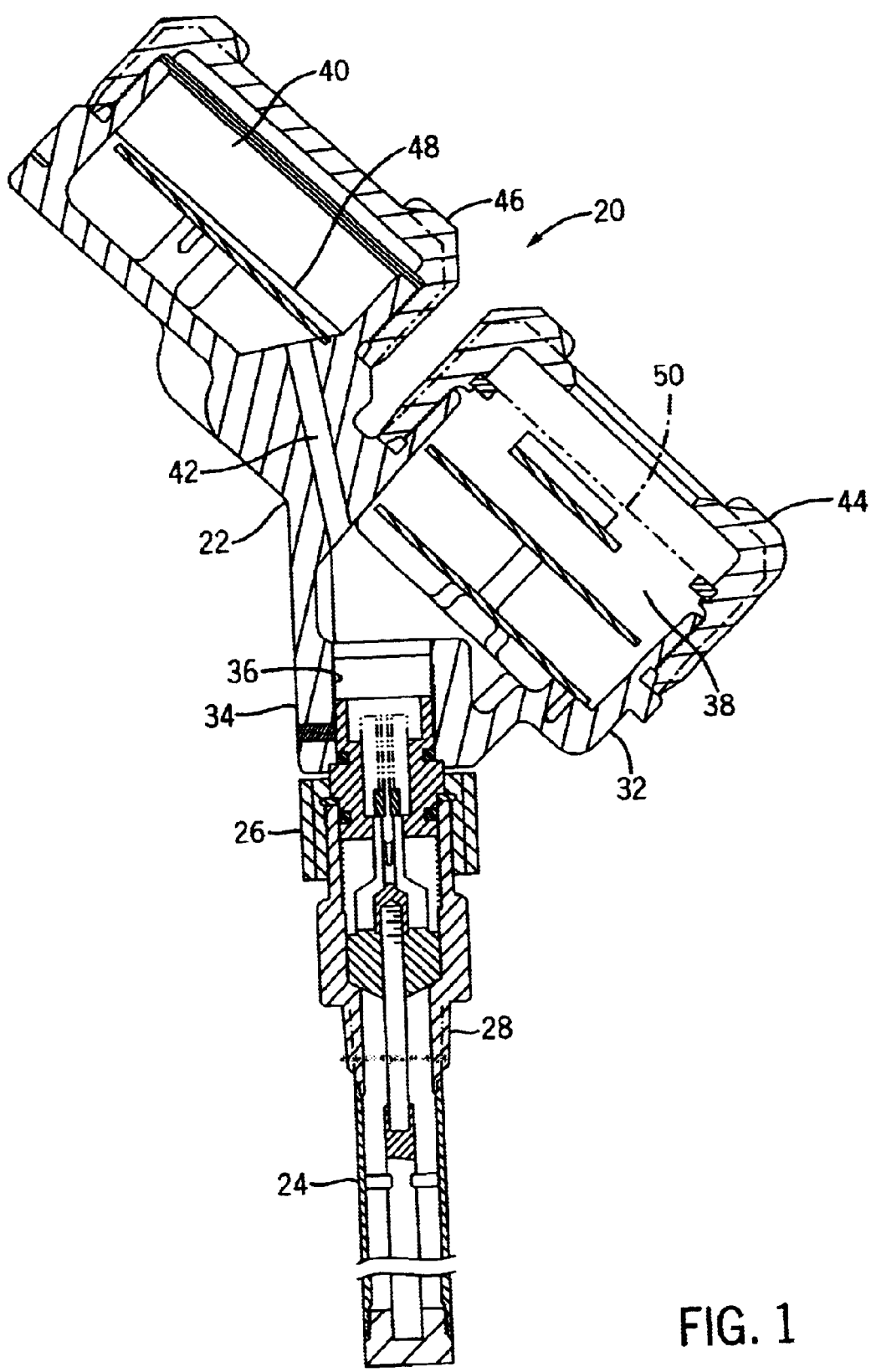
FIG. 1 is a side elevation view of a measurement instrument in accordance with the invention.

Referring to FIG. 1, a process instrument 20 according to the invention is illustrated. The process instrument 20 uses micropower impulse radar (MIR) in conjunction with equivalent time sampling (ETS) and ultra-wide band (UWB) transceivers for measuring level using time domain reflectometry (TDR). Particularly, the instrument 20 uses guided wave radar for sensing level. While the embodiment described herein relates to an MIR level sensing apparatus, various aspects of the invention may be used with other types of process instruments for measuring various process parameters.

The process instrument 20 includes a control housing 22, a probe 24, and a connector 26 connecting the probe 24 to the housing 22. The probe 24 is typically mounted to a process vessel (not shown) using a threaded fitting 28. Alternatively, a flange may be used. The housing 22 is then secured to the probe 24 as by threading the connector 26 to the probe 24 and also to the housing 22. As described below, the probe 24 comprises a high frequency transmission line which, when placed in a fluid, can be used to measure level of the fluid. Particularly, the probe 24 is controlled by electronics in the housing 22 for determining level in the vessel. These components may be as generally described in Mulrooney et al., U.S. Pat. No. 6,062,095, the specification of which is hereby incorporated by reference herein. As described therein, the probe 24 comprises a high frequency transmission line which, when placed in a fluid, can be used to measure level of the fluid. Particularly, the probe 24 is controlled by a controller, described below, in the housing 22 for determining level in the vessel.

The housing 22 includes a base assembly 32. The base assembly 32 is of cast construction and includes a cylindrical collar 34 having a threaded cylindrical through opening 36 for receiving the connector 26. The base assembly 32 includes an electronics compartment 38 and a wiring compartment 40. A tunnel opening 42 connects the electronics compartment 38 to the wiring compartment 40. The electronics compartment 38 is selectively closed with a first cover 44. The wiring compartment 40 is selectively closed with a second cover 46.

A wiring board assembly 48 in the wiring compartment connects the instrument 20 to remote control or indicating equipment. The instrument 20 comprises a two-wire loop power instrument that uses one set of wires to provide both the supply power and process measurement signal. The process measurement value is transmitted by varying the current of the loop. This is also known as a loop powered device. A transducer electronics assembly in the electronics compartment 38 is electrically connected, as described below, between the wiring board assembly 48 and the probe 24 for measuring the level and controlling the two-wire process loop responsive to the measured level.

While the measurement instrument 20 includes a dual compartment housing, the present invention could be used in connection with a single compartment housing, such as an explosion proof housing.

As described more particularly below, the controller 50 in the housing 22 generates and transmits pulses on the probe 24. A reflected signal is developed off any impedance changes, such as a liquid surface of a material being measured. A small amount of energy may continue down the probe.

Figure 2:
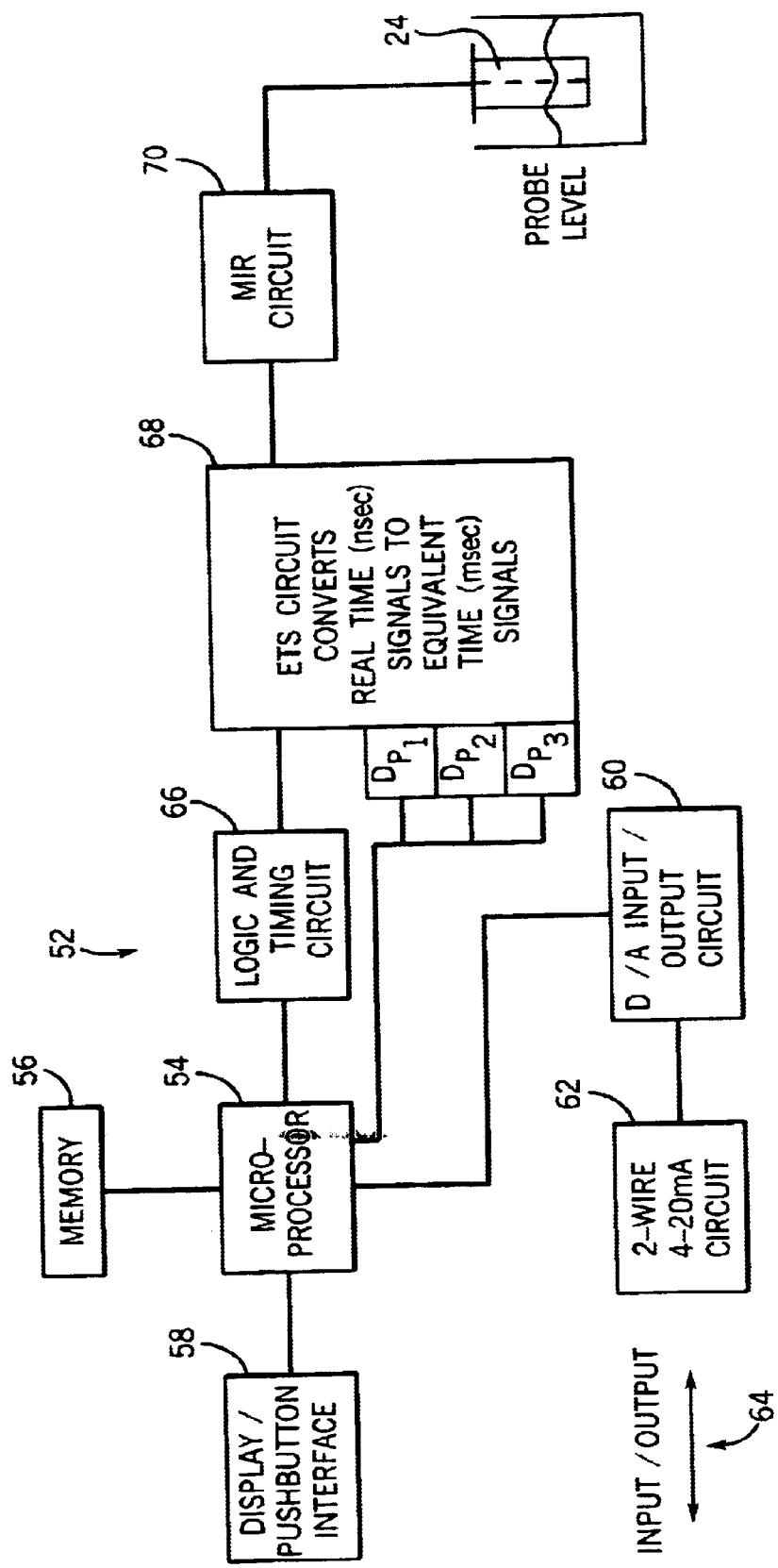
FIG. 2 is a block diagram of a control circuit for the instrument of FIG. 1.

Referring to FIG. 2, a control circuit 52 on the electronics assembly 50 of FIG. 1 is illustrated in block diagram form connected to the probe 24. The control circuit 52 includes a microprocessor 54 connected to a suitable memory 56 (the combination forming a computer) and a display/pushbutton interface 58. The display/push button interface 58 may be as generally described in the Mulrooney et al. patent incorporated by reference herein, and is used for entering parameters with a keypad and displaying user information. The memory 56 comprises both nonvolatile memory for storing programs and calibration parameters, as well as volatile memories used during level measurement, as described below.

The microprocessor 54 is also connected to a digital to analog input/output circuit 60, which is in turn connected to a two wire 4–20 mA circuit 62 for connecting, via the wiring board assembly 48 of FIG. 1, to remote devices, as represented by an input/output line 64. Particularly, the two wire circuit 62 utilizes loop control and power circuitry which is well known and commonly used in process instrumentation. The power is provided on the line 64 from an external power supply. The circuit 62 controls the current on the two-wire line 64 which represents level or other characteristics measured by the probe 24.

The instrument 20 may alternatively have the capability of implementing digital communications through the two wire circuit 62 with remote devices and the outside world. Such communication may uses the HART protocol, but could also use fieldbus protocols such as Foundation Fieldbus or Profibus PA.

The microprocessor 54 is also connected via a logic and timing circuit 66 to an ETS circuit 68. The logic and timing circuit 66 converts signals to appropriate levels and coordinates timing of such signal levels. The ETS circuit 68 is connected via an MIR circuit 70 to the probe 24. The ETS circuit 68 and the MIR circuit 70 are known and are generally in accordance with the teachings of McEwan, U.S. Pat. Nos. 5,345,471 and 5,609,059, the specifications of which are hereby incorporated by reference herein. The MIR circuit 70 generates hundreds of thousands of very fast pulses of 500 picoseconds or less rise time every second. The timing between pulses is tightly controlled. The reflected pulses are sampled at controlled intervals. The samples build a time multiplied "picture" of the reflected pulses. Since the pulses travel in the probe at the speed of light, this picture represents approximately ten nanoseconds in real time for a five-foot probe. The ETS circuit 68 converts the time to about 71 milliseconds. As is apparent, the exact time would depend on various factors, such as, for example, probe length. The largest signals have an amplitude of the order of 20 millivolts before amplification to the desired amplitude by common audio amplifiers. For a low power device, a threshold scheme is employed to give timed interrupts to the microprocessor 54 for select signals, namely, fiducial, target, level, and end of probe, as described below. The microprocessor 54 converts these timed interrupts into distance. With the probe length entered through the display/pushbutton interface 58, or some other interface, the microprocessor 54 can calculate the level by subtracting from the probe length the difference between the fiducial and level distances.

The known ETS circuit 68 is modified to include digital control by the microprocessor 54 of selected circuit parameters. Three digital potentiometers labeled DP1, DP2 and DP3 receive digital commands, having one of 256 settings representing desired resistance, from the microprocessor 54. The commanded resistance varies operation of the ETS circuit 68 for controlling the signal sent via the logic and timing circuit 66 to the microprocessor 54. The adjustments made by the respective digital potentiometers DP1, DP2, and DP3 are range, window and gain.

In accordance with the invention, the process instrument 20 uses a split intrinsic safety barrier, such as a split fuse protected diode safety barrier. This eliminates unwanted ground loops and does not distort the guided wave radar signal.

Figure 3:
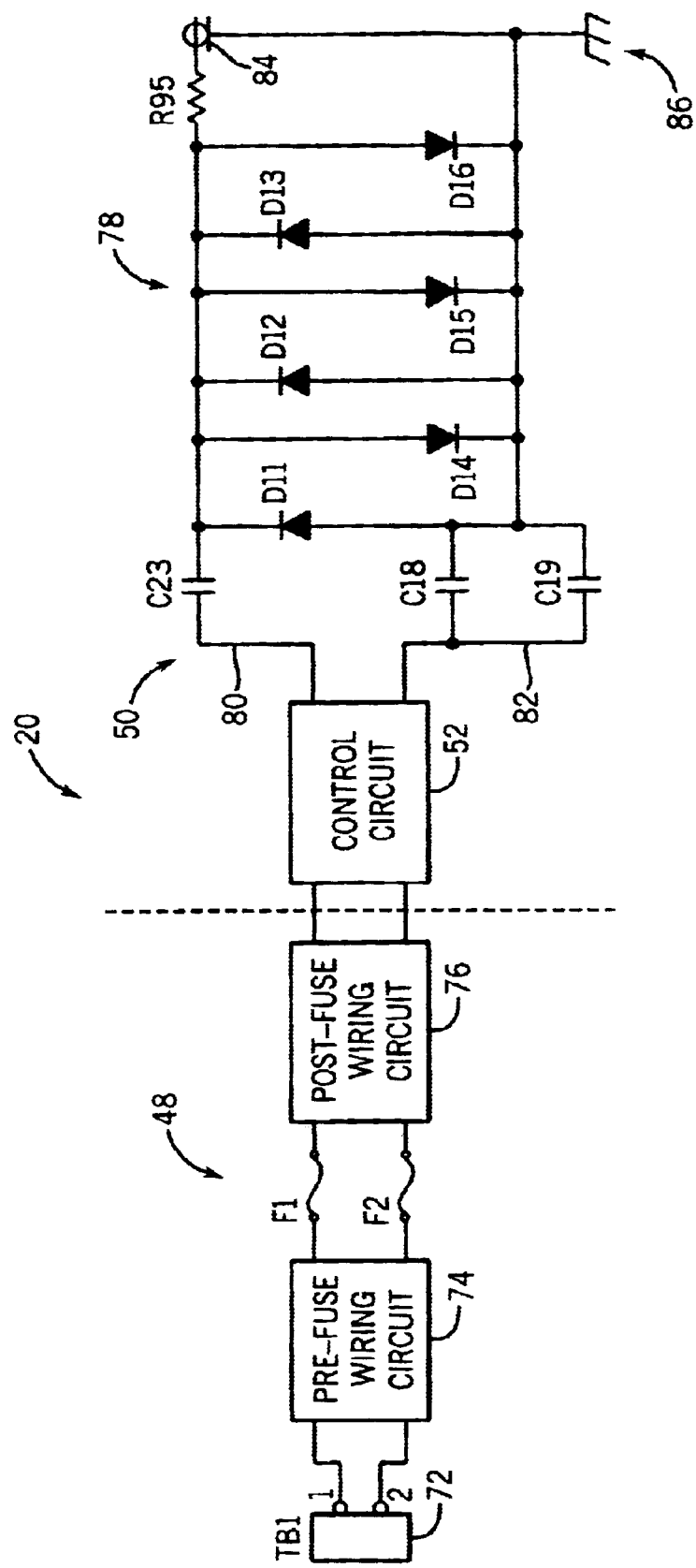
FIG. 3 is an electrical schematic of a split safety barrier used with the control circuit of FIG. 2.

With reference to FIG. 3, a combined schematic/block diagram illustrates the circuitry in the process instrument 20. The wiring board assembly 48 comprises a terminal 72 for connection to a two-wire process loop. A pair of fuses F1 and F2 are disposed between the terminal 72 and the control circuit 52 of the electronics assembly 50. Particularly, a pre-fuse wiring circuit 74 is shown as connected between the terminal 72 and the fuses F1 and F2. A post-fuse wiring circuit 76 is shown connected between the fuses F1 and F2 and the control circuit 52. The wiring circuits 74 and 76 may be nothing more than electrical conductors providing direct connection or may include other interface components, as necessary or desired for the particular operation.

A diode safety barrier circuit 78 is electrically connected between the control circuit 52 and the probe 24. Particularly, the control circuit 52 has as outputs a GWR send line 80 and a GWR return line 82. Coupling capacitors C18, C19 and C23 connect the send and return lines 80 and 82 to the diode safety barrier circuit 78. The diode safety barrier circuit 78 comprises six diodes D11, D12, D13, D14, D15 and D16 and a resistor R95. The diodes D11–D16 are connected in pairs with each pair being reverse connected to provide opposite polarity. A current limiting resistor R95 is connected in series between the capacitor C18 and one terminal of an active sensing element 84. A second terminal of the active sensing element 84 and the return side of the diodes D11–D16 are connected to ground 86.

The fuses F1 and F2 limit the amount of energy to a safe level for the diode safety barrier circuit 78. The fuses F1 and F2 will not effect the RF pulse shape as they are not in the RF output path. The fuses F1 and F2 could be replaced with active current limiters. The unprotected RF output to the probe 24 is AC coupled by the capacitors C18, C19 and C23. The barrier diodes D11–D13 limit the open circuit negative output voltage and the diodes D14–D16 limit the open circuit positive voltage to the barrier current limiting resistor R95 and the, active sensing element 84. The barrier diodes D11–D16 limit the voltage in the barrier current limiting resistor R95 limits the short circuit current.

The diode safety barrier circuit 78 and the fuses F1 and F2 make the process instrument safe for explosive atmosphere applications. In this split barrier configuration, the fuses F1 and F2 will not distort the GWR signal and the AC coupling of the diode safety barrier circuit 78 will eliminate ground loops through the two-wire process loop.

The barrier diodes D11–D16 comprise PIN diodes because of their low capacitance at the GWR signal pulse rise time. Alternatively, diode chains or three zener diodes could be used. Likewise active elements such as thyristors or transistors could be used. The resistor R95 is shown as one resistor, but could be replaced with multiple resistors.

The present application describes the process instrument 20 in the form of a guided wave radar level transmitter. As is apparent, the split intrinsic safety barrier in accordance with the invention could be used with any technologies and measurements that introduce an active element into a hazardous location. For example, the active sensing element 84 could be a through air radar transducer, an ultrasonic transducer, a capacitance probe or the like. As is apparent, the control circuit 52 is designed according to the sense characteristic from the particular active element, as will be apparent to those skilled in the art.

I claim:

1. A process instrument comprising:
   a housing;
   a terminal in the housing for connection to a two wire process loop;
   an active element for sensing a characteristic of a process;
   a control circuit disposed between the terminal and the active element for measuring the sensed characteristic and controlling the two wire process loop responsive to the sensed characteristic; and
   a split intrinsic safety barrier comprising current limiters electrically connected between the terminal and the control circuit and a diode safety barrier electrically connected between the control circuit and the active element.

2. The process instrument of claim 1 wherein the active element comprises a guided wave radar transmission line.

3. The process instrument of claim 1 wherein the active element comprises a capacitance probe.

4. The process instrument of claim 1 wherein the active element comprises a through air radar transducer.

5. The process instrument of claim 1 wherein the active element comprises an ultrasonic transducer.

6. The process instrument of claim 1 wherein the current limiters comprise fuses.

7. The process instrument of claim 1 wherein the diode safety barrier comprises a plurality of diodes connected across the active element.

8. The process instrument of claim 1 wherein the diode safety barrier comprises a plurality of pairs of reverse connected diodes.

9. The process instrument of claim 1 wherein the diode safety barrier is AC coupled to the control circuit.

10. The process instrument of claim 1 wherein the diode safety barrier comprises a current limit resistor.

11. An explosion proof process instrument comprising:
    an explosion proof housing;
    a terminal in the housing for connection to a two wire process loop;
    an active element operatively connected to the housing for sensing a characteristic of a process;
    a control circuit in the housing disposed between the terminal and the active element for measuring the sensed characteristic and controlling the two wire process loop responsive to the sensed characteristic; and
    a split intrinsic safety barrier in the housing comprising current limit means electrically connected between the terminal and the control circuit for limiting energy to the control circuit and safety barrier means electrically connected between the control circuit and the active element for limiting output voltage to the active element.

12. The explosion proof process instrument of claim 11 wherein the active element comprises a guided wave radar transmission line.

13. The explosion proof process instrument of claim 11 wherein the active element comprises a capacitance probe.

14. The explosion proof process instrument of claim 11 wherein the active element comprises a through air radar transducer.

15. The explosion proof process instrument of claim 11 wherein the active element comprises an ultrasonic transducer.

16. The explosion proof process instrument of claim 11 wherein the current limit means comprise fuses.

17. The explosion proof process instrument of claim 11 wherein the safety barrier means comprises a plurality of diodes connected across the active element.

18. The explosion proof process instrument of claim 11 wherein the safety barrier means comprises a plurality of pairs of reverse connected diodes.

19. The explosion proof process instrument of claim 11 wherein the safety barrier means is AC coupled to the control circuit.

20. The explosion proof process instrument of claim 11 wherein the safety barrier means comprises a current limit resistor.

* * * * *